US008959279B2

(12) United States Patent
Ash et al.

(10) Patent No.: US 8,959,279 B2
(45) Date of Patent: *Feb. 17, 2015

(54) POPULATING A FIRST STRIDE OF TRACKS FROM A FIRST CACHE TO WRITE TO A SECOND STRIDE IN A SECOND CACHE

(75) Inventors: Kevin J. Ash, Tucson, AZ (US); Michael T. Benhase, Tucson, AZ (US); Lokesh M. Gupta, Tucson, AZ (US); Matthew J. Kalos, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/464,668

(22) Filed: May 4, 2012

(65) Prior Publication Data

US 2013/0185478 A1    Jul. 18, 2013

Related U.S. Application Data

(63) Continuation of application No. 13/352,230, filed on Jan. 17, 2012.

(51) Int. Cl.
G06F 12/00    (2006.01)
G06F 13/00    (2006.01)
G06F 13/28    (2006.01)

(52) U.S. Cl.
USPC ........... 711/103; 711/118; 711/119; 711/122; 711/126; 711/133; 711/141; 711/E12.024; 711/E12.043

(58) Field of Classification Search
CPC . G06F 12/0866; G06F 12/0897; G06F 3/061; G06F 12/0873; G06F 12/0815; G06F 12/0811; G06F 9/3834

USPC .................................................. 711/118, 122
See application file for complete search history.

(56) References Cited

U.S. PATENT DOCUMENTS 4,464,713 A    8/1984    Benhase et al.
5,860,090 A    1/1999    Clark (Continued)

FOREIGN PATENT DOCUMENTS

CN    1967495    5/2007
CN    1967507    5/2007
WO    2011042428    4/2011

OTHER PUBLICATIONS

Office Action dated Aug. 30, 2013, pp. 55, for U.S. Appl. No. 13/352,224, filed Jan. 17, 2012, by inventors M. et al.

(Continued)

*Primary Examiner* — Kenneth Lo
*Assistant Examiner* — Sidney Li
(74) *Attorney, Agent, or Firm* — David W. Victor; Konrad Raynes Davda & Victor LLP

(57) ABSTRACT

Provided are a computer program product, system, and method for managing data in a cache system comprising a first cache, a second cache, and a storage system. A determination is made of tracks stored in the storage system to demote from the first cache. A first stride is formed including the determined tracks to demote. A determination is made of a second stride in the second cache in which to include the tracks in the first stride. The tracks from the first stride are added to the second stride in the second cache. A determination is made of tracks in strides in the second cache to demote from the second cache. The determined tracks to demote from the second cache are demoted.

11 Claims, 8 Drawing Sheets

(56) References Cited

U.S. PATENT DOCUMENTS

| | | | |
|---|---|---|---|
| 5,860,091 | A | 1/1999 | DeKoning et al. |
| 6,321,240 | B1 | 11/2001 | Chilimbi et al. |
| 6,785,771 | B2 | 8/2004 | Ash et al. |
| 7,107,385 | B2 | 9/2006 | Rajan et al. |
| 7,444,478 | B2 | 10/2008 | LaFrese et al. |
| 7,562,203 | B2 | 7/2009 | Scott et al. |
| 7,650,341 | B1 | 1/2010 | Oratovsky et al. |
| 7,669,022 | B2 | 2/2010 | Maruyama et al. |
| 7,698,501 | B1 | 4/2010 | Corbett et al. |
| 7,702,870 | B2 | 4/2010 | English et al. |
| 7,721,043 | B2 | 5/2010 | Gill et al. |
| 7,725,651 | B2 | 5/2010 | Saito |
| 7,769,960 | B2 | 8/2010 | LaFrese et al. |
| 7,930,325 | B2 | 4/2011 | Siegwart et al. |
| 2001/0029574 | A1 | 10/2001 | Razdan et al. |
| 2002/0166022 | A1* | 11/2002 | Suzuki ............... 711/103 |
| 2002/0199070 | A1* | 12/2002 | Chaudhry et al. ........ 711/147 |
| 2003/0028695 | A1 | 2/2003 | Burns et al. |
| 2003/0070042 | A1* | 4/2003 | Byrd et al. ............. 711/114 |
| 2003/0105928 | A1 | 6/2003 | Ash et al. |
| 2004/0068612 | A1* | 4/2004 | Stolowitz .............. 711/114 |
| 2004/0098541 | A1* | 5/2004 | Megiddo et al. ........ 711/129 |
| 2005/0073884 | A1 | 4/2005 | Gonzalez et al. |
| 2005/0144360 | A1* | 6/2005 | Bennett et al. .......... 711/103 |
| 2005/0257083 | A1 | 11/2005 | Cousins |
| 2006/0106891 | A1 | 5/2006 | Mahar et al. |
| 2006/0155934 | A1* | 7/2006 | Rajamony et al. ........ 711/134 |
| 2007/0106707 | A1 | 5/2007 | Yamato |
| 2007/0118695 | A1 | 5/2007 | Lowe et al. |
| 2009/0210620 | A1* | 8/2009 | Jibbe et al. ............ 711/114 |
| 2009/0216954 | A1 | 8/2009 | Benhase et al. |
| 2009/0271412 | A1 | 10/2009 | Lacapra et al. |
| 2009/0271418 | A1 | 10/2009 | Vaghani et al. |
| 2010/0082774 | A1 | 4/2010 | Pitts |
| 2010/0166022 | A1 | 7/2010 | Cho |
| 2010/0191907 | A1 | 7/2010 | Ish |
| 2010/0293420 | A1* | 11/2010 | Kapil et al. ............ 714/710 |
| 2011/0087837 | A1 | 4/2011 | Blinick et al. |
| 2011/0191523 | A1 | 8/2011 | Caulkins |
| 2011/0202732 | A1* | 8/2011 | Montgomery ........... 711/154 |
| 2013/0111106 | A1 | 5/2013 | Benhase et al. |
| 2013/0111134 | A1 | 5/2013 | Benhase et al. |

OTHER PUBLICATIONS

UK Combined Search Report & Examination Report dated Jul. 19, 2013 for GB1300444.5 filed Jan. 10, 2013.
English Translation of CN1967495 filed May 23, 2007 by IBM Corp.
English Translation of CN1967507 filed May 23, 2007 by IBM Corp.
U.S. Appl. No. 13/352,224, filed Jan. 17, 2012, entitled "Demoting Tracks From a First Cache to a Second Cache by Using an Occupancy of Valid Tracks in Strides in the Second Cache to Consolidate Strides in the Second Cache", by inventors M. Benhase,and L. Gupta.
U.S. Appl. No. 13/352,236, filed Jan. 17, 2012, entitled "Demoting Tracks From a First Cache to a Second Cache by Using a Stride Number Ordering of Strides in the Second Cache to Consolidate Strides in the Second Cache", by inventors M. Benhase,and L. Gupta.
U.S. Appl. No. 13/352,239, filed Jan. 17, 2012, entitled "Demoting Partial Tracks From a First Cache to a Second Cache", by inventors K. Ash, M. Benhase,and L. Gupta.
U.S. Appl. No. 13/113,974, filed May 23, 2011, entitled "Cache Management of Tracks in a First Cache and a Second Cache for Storage", by inventors M.Benhase, et al.
U.S. Appl. No. 13/113,931, filed May 23, 2011, entitled "Populating Strides of Tracks to Demote From a First Cache to a Second Cache", by inventors M.Benhase, et al.
U.S. Appl. No. 13/113,937, filed May 23, 2011, entitled "Managing Unmodified Tracks Maintained in Both a First Cache and a Second Cache", by inventors K. Ash, et al.
U.S. Appl. No. 13/113,944, filed May 23, 2011, entitled "Caching Data in a Storage System Having Multiple Caches Including Non-Volatile Storage Cache in a Sequential Access Storage Device", by inventors M.Benhase, et al.
U.S. Appl. No. 13/113,949, filed May 23, 2011, entitled "Using an Attribute of a Write Request to Determine Where to Cache Data in a Storage System Having Multiple Caches Including Non-Volatile Storage Cache in a Squential Access Storage Device", by inventors M.Benhase, et al.
U.S. Appl. No. 13/113,953, filed May 23, 2011, entitled "Handling High Priroity Requests in a Sequential Access Storage Device Having a Non-Volatile Storage Cache", by inventors M. Benhase, et al.
U.S. Appl. No. 13/113,958, filed May 23, 2011, entitled "Handling High Priroity Requests in a Sequential Access Storage Device Having a Non-Volatile Storage Cache", by inventors M. Benhase, et al.
"Check Point Copy for a Two Stage Store", IBM Corp., IP.com Document No. IPCOM000089366D,TDB 10-77, pp. 1955-1958, Oct. 1, 1977, pp. 1-5.
"Serial ATA Native Command Queuing" joint WhitePaper by Intel Corporation and Seagate Technology, Jul. 2003, pp. 1-12.
"Multiple Command Control and Reordering", [online] [retrieved May 14, 2011],pp. 1-2 http://www.pcguide.com/ref/hdd/op/logicMultiple-c.html.
"Superparamagnetic Effect on Hard Disk Drive", [online] [retrieved May 16, 2011], pp. 1-2, http://www.dataclinic.co.uk/hard-disk-superparamagnetic-effect.html.
"Superparamagnetism", Wikipedia, [online] [retrieved May 19, 2011], pp. 1-5, http://en.wikipedia.org/w/index/php?title=Superparamagnetism&printable . . . .
"Seagate's Terabyte Platters Make it the Densest of the Lot", The Register, [online] [retrieved May 19, 2011], pp. 1-2, http://www.theregister.co.uk/2011/05/03seagate_terabyte_platter/ . . . .
Hitachi Demos 230 Gb Per Square Inch Data Density on Perpendicular Re . . . , [online] [retrieved May 19, 2011], pp. 1-9, http://www.physorg.com/news3588.html.
"Hard Disk Drive", Wikipedia, [online] [retrieved May 19, 2011], pp. 1-23, http://en.wikipedia.org/w/index.php?title=hard_disk_drive&printable=yes.
U.S. Appl. No. 13/352,230, filed Jan. 17, 2012, entitled "Populating a First Stride of Tracks From a First Cache to Write to a Second Stride in a Second Cache", by inventors M.Benhase, et al.
Preliminary Amendment for U.S. Appl. No. 13/352,230, filed May 4, 2012, 8 pp.
Office Action dated Jul. 8, 2013, pp. 31, for U.S. Appl. No. 13/113,931, filed May 23, 2011 by M.T. Benhase et al.
Office Action dated Jul. 9, 2013, pp. 28, for U.S. Appl. No. 13/465,717, by M.T. Benhase et al.
PCT Search Report & Written Opinion dated May 2, 2013 for PCT/IB2012/057140 filed Dec. 10, 2012.
Office Action dated Oct. 10, 2013, pp. 45, for U.S. Appl. No. 13/779,412, filed Feb. 27, 2013.
Preliminary Amendment 1, filed Jul. 12, 2011, 16 pp., for U.S. Appl. No. 13/113,931, filed May 23, 2011 by M.T. Benhase et al.
Preliminary Amendment 2, filed May 7, 2012, 8 pp., for U.S. Appl. No. 13/113,931, filed May 23, 2011 by M.T. Benhase et al.
U.S. Appl. No. 13/465,717, filed May 7, 2012, by inventors M.Benhase, et al.
Preliminary Amendment, pp. 20, filed May 7, 2012, for U.S. Appl. No. 13/465,717, by M.T. Benhase et al.
Preliminary Amendment filed Feb. 27, 2013, pp. 9, for U.S. Appl. No. 13/352,224, filed Jan. 17, 2012, by inventors M. et al.
U.S. Appl. No. 13/779,309, filed Feb. 27, 2013, by inventors M. et al.
Preliminary Remarks filed Feb. 27, 2013, pp. 2, for U.S. Appl. No. 13/779,309, filed Feb. 27, 2013, by inventors M. et al.
Preliminary Amendment filed Feb. 27, 2013, pp. 8, for U.S. Appl. No. 13/352,236, filed Jan. 17, 2012, by inventors M. Benhase et al.
U.S. Appl. No. 13/779,412 , filed Feb. 27, 2013, by inventors M. Benhase et al.
Preliminary Remarks filed Feb. 27, 2013, pp. 2, for U.S. Appl. No. 13/779,412, filed Feb. 27, 2013, by inventors M. Benhase et al.
Preliminary Amendment filed Feb. 27, 2013, pp. 8, for U.S. Appl. No. 13/352,239, filed Jan. 17, 2012, by inventors K. Ash, et al.
U.S. Appl. No. 13/779,439, filed Feb. 27, 2013, by inventors K. Ash, et al.
Preliminary Remarks filed Feb. 27, 2013, pp. 2, for U.S. Appl. No. 13/779,439, filed Feb. 27, 2013, by inventors K. Ash, et al.

(56) References Cited

OTHER PUBLICATIONS

Response dated Oct. 8, 2013, pp. 12, to Office Action dated Jul. 8, 2013, pp. 31, for U.S. Appl. No. 13/113,931, filed May 23, 2011.
Office Action dated Sep. 5, 2013, pp. 33, for U.S. Appl. No. 13/779,309, filed Feb. 27, 2013.
Office Action dated Oct. 3, 2013, pp. 37, for U.S. Appl. No. 13/352,236, filed Jan. 17, 2012.
Response dated Oct. 8, 2013 to Office Action dated Jul. 9, 2013, pp. 28, for U.S. Appl. No. 13/465,717.
Office Action dated Nov. 8, 2013, pp. 65 for U.S. Appl. No. 13/352,230.
Notice of Allowance dated Jan. 28, 2014, pp. 14, for U.S. Appl. No. 13/465,717.
Response dated Jan. 21, 2014, pp. 13, to Office Action dated Oct. 18, 2013, pp. 54, for U.S. Appl. No. 13/352,239, filed Jan. 17, 2012.
Response dated Jan. 21, 2014, pp. 10, to Office Action dated Oct. 25, 2013, pp. 49, for U.S. Appl. No. 13/779,439, filed Feb. 27, 2013.
Response dated Feb. 7, 2014, pp. 13, to Office Action dated Nov. 8, 2013, pp. 65 for U.S. Appl. No. 13/352,230.
Notice of Allowance dated Oct. 25, 2013, pp. 30, for U.S. Appl. No. 13/465,717.
UK Response dated Dec. 9, 2013 to Official Letter received Jul. 19, 2013 for GB1300444.5 filed Jan. 10, 2013.
Response dated Dec. 2, 2013, p. 13 to Office Action dated Aug. 30, 2013, pp. 55, for U.S. Appl. No. 13/352,224, filed Jan. 17, 2012, by inventors M. et al.
Response dated Dec. 5, 2013, pp. 9, to Office Action dated Sep. 5, 2013, pp. 33, for U.S. Appl. No. 13/779,309, filed Feb. 27, 2013.
Response dated Jan. 3, 2014, pp. 1, to Office Action dated Oct. 3, 2013, pp. 37, for U.S. Appl. No. 13/352,236, filed Jan. 17, 2012.
Response dated Jan. 10, 2014, pp. 9, for U.S. Appl. No. 13/779,412, filed Feb. 27, 2013.
Office Action dated Oct. 18, 2013, pp. 54, for U.S. Appl. No. 13/352,239, filed Jan. 17, 2012.
Office Action dated Oct. 25, 2013, pp. 49, for U.S. Appl. No. 13/779,439, filed Feb. 27, 2013.
Office Action dated Dec. 24, 2013, pp. 38, for U.S. Appl. No. 13/113,931, filed May 23, 2011 by M.T. Benhase et al.
Office Action dated Jan. 10, 2014, pp. 67, for U.S. Appl. No. 13/352,236, filed Jan. 17, 2012.
Final Office Action dated Apr. 7, 2014, pp. 41, for U.S. Appl. No. 13/352,239, filed Jan. 17, 2012.
Final Office Action dated Oct. 25, 2014, pp. 38, for U.S. Appl. No. 13/779,439, filed Feb. 27, 2013.
Response dated Apr. 8, 2014, pp. 10, to Office Action dated Jan. 10, 2014, pp. 67, for U.S. Appl. No. 13/352,236, filed Jan. 17, 2012.
Notice of Allowance dated Apr. 29, 2014, pp. 55, for U.S. Appl. No. 13/352,224, filed Jan. 17, 2012, by inventors M. et al.
Notice of Allowance dated Apr. 30, 2014, pp. 50, for U.S. Appl. No. 13/779,309, filed Feb. 27, 2013.
Notice of Allowance dated Apr. 30, 2014, pp. 29, for U.S. Appl. No. 13/352,236, filed Jan. 17, 2012.
Notice of Allowance dated Apr. 22, 2014, pp. 45, U.S. Appl. No. 13/779,412, filed Feb. 27, 2013.
Notice of Allowance dated Apr. 17, 2014, pp. 18, for U.S. Appl. No. 13/113,931, filed May 23, 2011.
Response dated Mar. 24, 2014, pp. 10, to Office Action dated Dec. 24, 2013, pp. 38, for U.S. Appl. No. 13/113,931, filed May 23, 2011.
Final Office Action dated Mar. 24, 2014, pp. 37, for U.S. Appl. No. 13/352,230.

* cited by examiner

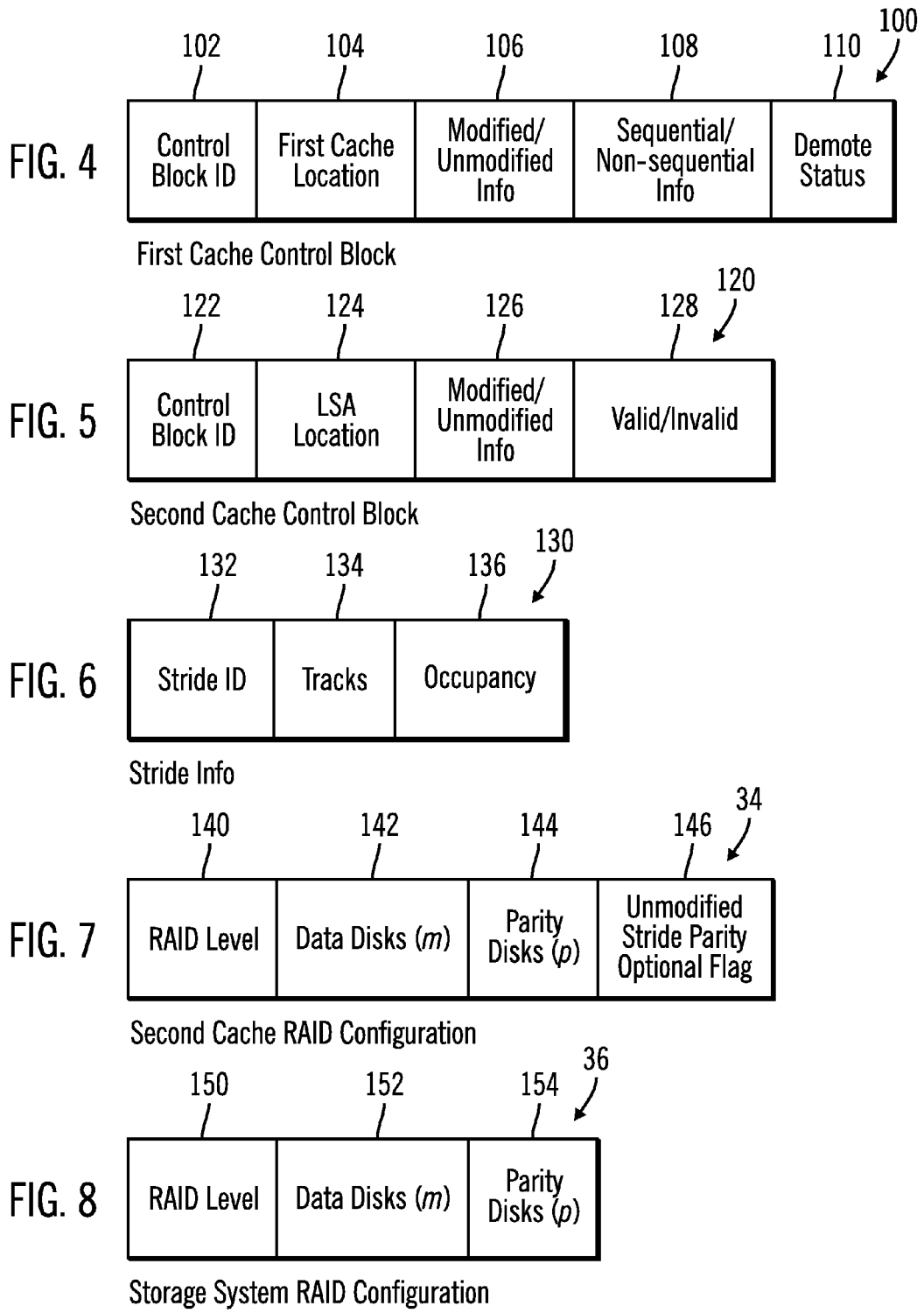

POPULATING A FIRST STRIDE OF TRACKS FROM A FIRST CACHE TO WRITE TO A SECOND STRIDE IN A SECOND CACHE

CROSS-REFERENCE TO RELATED APPLICATION

This application is a continuation of U.S. patent application Ser. No. 13/352,230, filed Jan. 17, 2012, which application is incorporated herein by reference in its entirety.

BACKGROUND OF THE INVENTION

1. Field of the Invention

The present invention relates to a computer program product, system, and method for populating a first stride of tracks from a first cache to write to a second stride in a second cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

There is a need in the art for improved techniques for using cache in a storage system.

SUMMARY

Provided are a computer program product, system, and method for managing data in a cache system comprising a first cache, a second cache, and a storage system. A determination is made of tracks stored in the storage system to demote from the first cache. A first stride is formed including the determined tracks to demote. A determination is made of a second stride in the second cache in which to include the tracks in the first stride. The tracks from the first stride are added to the second stride in the second cache. A determination is made of tracks in strides in the second cache to demote from the second cache. The determined tracks to demote from the second cache are demoted.

BRIEF DESCRIPTION OF THE DRAWINGS

FIG. 4 illustrates an embodiment of a first cache control block.

FIG. 5 illustrates an embodiment of a second cache control block.

FIG. 6 illustrates an embodiment of stride information.

FIG. 7 illustrates an embodiment of a second cache RAID configuration.

FIG. 8 illustrates an embodiment of a storage RAID configuration.

DETAILED DESCRIPTION

Described embodiments provide techniques for promoting tracks from a first cache in strides so that the tracks may be written as full stride writes to strides in the second cache to improve the efficiency of cache promotion operations. Further, while tracks are being promoted from the first cache 14 to the second cache 18 as strides, tracks are demoted from the second cache 18 on a track basis according to a cache demotion algorithm, such as an LRU algorithm. Further, strides in the second cache that are partially full, i.e., having valid and invalid tracks, may be combined into one stride to free strides in the second cache to receive further strides of tracks from the first cache, so that the second cache maintains free strides available for strides formed from the tracks in the first cache.

Figure 1:
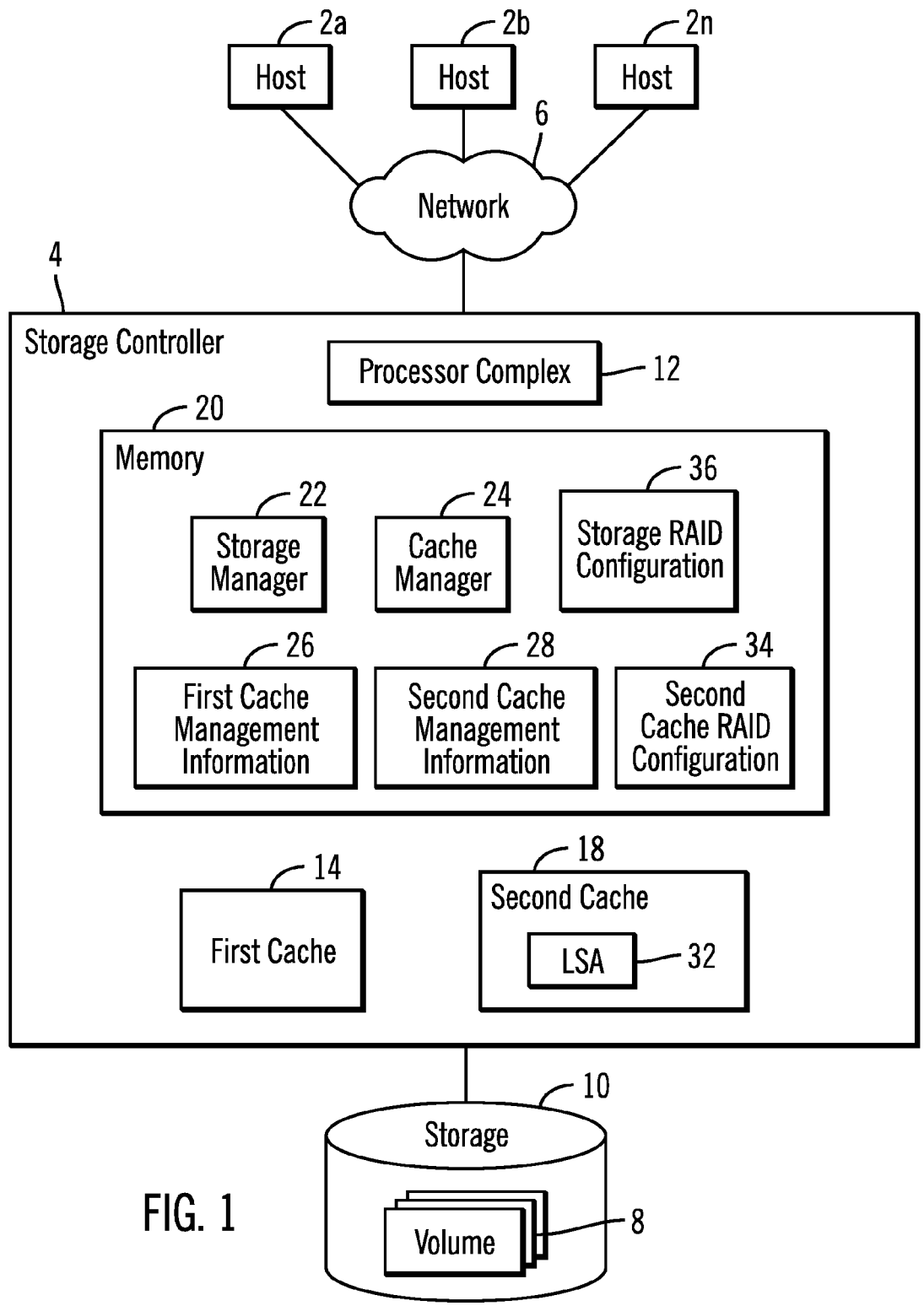
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 includes a processor complex 12, including one or more processors with single or multiple cores, a first cache 14 and a second cache 18. The first 14 and second 18 caches cache data transferred between the hosts 2a, 2b . . . 2n and the storage 10.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the first cache 14, and the second cache 18. A track may comprise any unit of data configured in the storage 10, such as a track, Logical Block Address (LBA), etc., which is part of a larger grouping of tracks, such as a volume, logical device, etc. The cache manager 24 maintains first cache management information 26 and second cache management information 28 to manage read (unmodified) and write (modified) tracks in the first cache 14 and the second cache 18.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store tracks in a log structured array (LSA) 32, where tracks are written in a sequential order as received, thus providing a temporal ordering of the tracks written to the second cache 18. In an LSA, later versions of tracks already present in the LSA are written at the end of the LSA 32. In alternative embodiments, the second cache 18 may store data in formats other than in an LSA.

The memory 20 further includes second cache RAID configuration information 34 providing information on a RAID configuration used to determine how to form a stride of tracks to store in the second cache 18. In one embodiment, the second cache 18 may be comprised of a plurality of storage devices, such as separate solid state storage devices (SSDs), such that the strides formed of tracks from the first cache 14 are striped across the separate storage devices forming the second cache 18, such as flash memories. In a further embodiment, the second cache 18 may comprise a single storage device, such as one flash memory, such that the tracks are grouped in strides as defined by the second cache RAID configuration 34, but the tracks are written as strides to a single device, such as one flash memory, implementing the second cache 18. The tracks of strides configured for the second cache RAID configuration 34 may be written to the LSA 32 in the second cache 18 device. The second cache RAID configuration 34 may specify different RAID levels, e.g., levels 5, 10, etc.

The memory 20 further includes storage RAID configuration information 36 providing information on a RAID configuration used to determine how to write tracks from the first cache 14 or second cache 18, if the second cache 18 should store modified data, to the storage system 10, where the tracks in the destaged stride are striped across the storage devices, such as disk drives, in the storage system 10.

In one embodiment, the first cache 14 may comprise a Random Access Memory (RAM), such as a Dynamic Random Access Memory (DRAM), and the second cache 18 may comprise a flash memory, such as a solid state device, and the storage 10 is comprised of one or more sequential access storage devices, such as hard disk drives and magnetic tape. The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storage 10.

The first cache 14 may be part of the memory 20 or implemented in a separate memory device, such as a DRAM.

The network 6 may comprise a Storage Area Network (SAN), a Local Area Network (LAN), a Wide Area Network (WAN), the Internet, and Intranet, etc.

Figure 2:
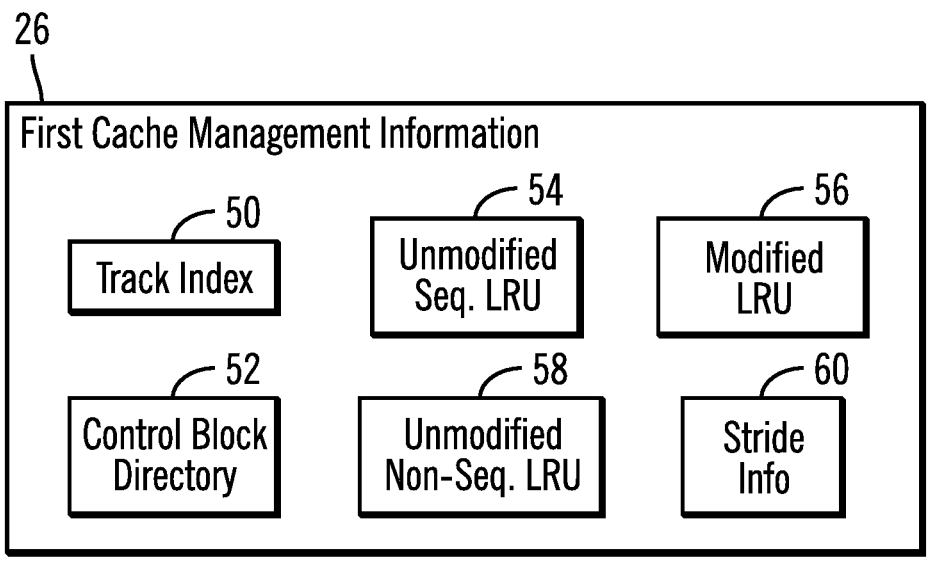
FIG. 2 illustrates an embodiment of first cache management information.

FIG. 2 illustrates an embodiment of the first cache management information 26 including a track index 50 providing an index of tracks in the first cache 14 to control blocks in a control block directory 52; an unmodified sequential LRU list 54 providing a temporal ordering of unmodified sequential tracks in the first cache 14; a modified LRU list 56 providing a temporal ordering of modified sequential and non-sequential tracks in the first cache 14; an unmodified non-sequential LRU list 58 providing a temporal ordering of unmodified non-sequential tracks in the first cache 14; and stride information 60 providing information on strides formed of unmodified non-sequential tracks in the first cache 14 to write to the second cache 18 as a full stride write.

In certain embodiments, upon determining that the first cache 18 is full, the modified LRU list 56 is used to destage modified tracks from the first cache 14 to the storage 10 so that the copy of those destaged tracks in the first cache 18.

Once a modified non-sequential track is destaged from the first cache 14 to the storage 10, then the cache manager 24 may designate that destaged tracks as an unmodified non-sequential track in the first cache 14 and add indication of the newly designated unmodified track to the unmodified non-sequential LRU list 58, from where it is eligible to be promoted to the second cache 14. The state of the destaged modified track may be changed by updating the first cache control block 104 to indicate the destaged modified non-sequential track as unmodified in field 106. Thus, unmodified non-sequential tracks in the first cache 14 may comprise read data or modified non-sequential tracks that were destaged to the storage 10 according to the modified LRU list 56. Thus, destaged modified tracks that become unmodified tracks in the LRU list 58 may be promoted to the second cache 14 to be available for subsequent read requests. In these embodiments, the second cache 14 comprises a read only cache to cache unmodified non-sequential tracks.

Figure 3:
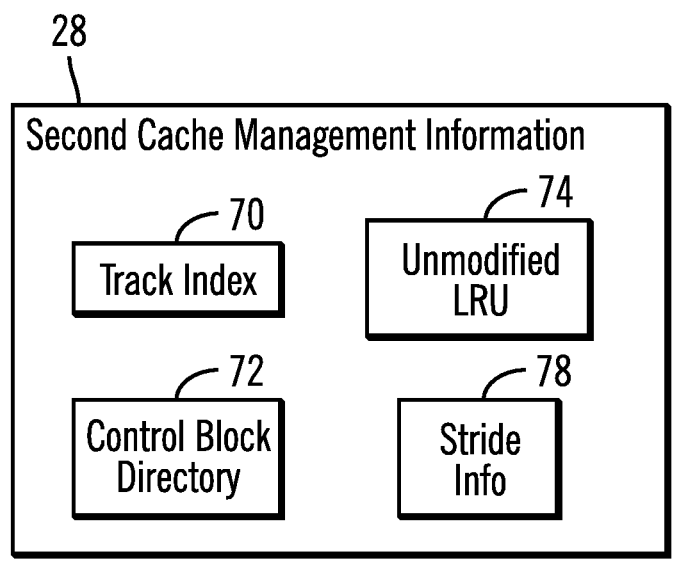
FIG. 3 illustrates an embodiment of second cache management information.

FIG. 3 illustrates an embodiment of the second cache management information 28 including a track index 70 providing an index of tracks in the second cache 18 to control blocks in a control block directory 72; an unmodified list 74 providing a temporal ordering of unmodified tracks in the second cache 18; and stride information 78 providing information on strides of tracks written to the second cache 18. In one embodiment, the second cache 18 only stores unmodified, non-sequential tracks. In further embodiments, the second cache 18 may also store modified and/or sequential tracks.

All the LRU lists 54, 56, 58, and 74 may include the track IDs of tracks in the first cache 14 and the second cache 18 ordered according to when the identified track was last accessed. The LRU lists 54, 56, 58, and 74 have a most recently used (MRU) end indicating a most recently accessed track and a LRU end indicating a least recently used or accessed track. The track IDs of tracks added to the caches 14 and 18 are added to the MRU end of the LRU list and tracks demoted from the caches 14 and 18 are accessed from the LRU end. The track indexes 50 and 70 may comprise a scatter index table (SIT). Alternative type data structures may be used to provide the temporal ordering of tracks in the caches 14 and 18.

Non-sequential tracks may comprise Online Line Transaction Processing (OLTP) tracks, which often comprise small block writes that are not fully random and have some locality of reference, i.e., have a probability of being repeatedly accessed.

FIG. 4 illustrates an embodiment of a first cache control block 100 entry in the control block directory 52, including a control block identifier (ID) 102, a first cache location 104 of the physical location of the track in the first cache 14, information 106 indicating whether the track is modified or unmodified, information 108 indicating whether the track is a sequential or non-sequential access, and information 110 indicating a demote status for the track, such as no demotion, ready to demote, and demote complete.

FIG. 5 illustrates an embodiment of a second cache control block 120 entry in the second cache control block directory 72, including a control block identifier (ID) 122; an LSA location 124 where the track is located in the LSA 32; modified/unmodified info 126 indicating whether the track is modified or unmodified; and valid/invalid flag 128 indicating whether the track is valid or invalid. A track in the second cache 18 is indicated as invalid if the track is updated in the first cache 14 or if the track is demoted from the second cache 18.

Once a modified non-sequential track is destaged from the first cache 14 to the storage 10, then the cache manager 24 may designate that destaged tracks as an unmodified non-sequential track in the first cache 14 and add indication of the newly designated unmodified track to the unmodified non-sequential LRU list 58, from where it is eligible to be promoted to the second cache 14. The state of the destaged modified track may be changed by updating the first cache control block 100 to indicate the destaged modified non-sequential track as unmodified in field 106. Thus, unmodified non-sequential tracks in the first cache 14 may comprise read data or modified non-sequential tracks that were destaged to the storage 10 according to the modified LRU list 56. Thus, destaged modified tracks that become unmodified tracks in the LRU list 58 may be promoted to the second cache 14 to be available for subsequent read requests. In these embodiments, the second cache 14 comprises a read only cache to cache unmodified non-sequential tracks.

FIG. 6 illustrates an instance 130 of the stride information 60, 78 for one stride to be formed in the second cache 18, including a stride identifier (ID) 132, tracks 134 of the storage 10 included in the stride 132, and an occupancy 136 indicating a number of valid tracks in the stride of the total number of tracks, where the tracks in the stride that are not valid are eligible for garbage collection operations.

FIG. 7 illustrates an embodiment of the second cache RAID configuration 34 that is maintained to determine how to form strides of tracks in the second cache 18 from the tracks in the first cache 14. A RAID level 140 indicates the RAID configuration to use, e.g., RAID 1, RAID 5, RAID 6, RAID 10, etc., a number of data disks (m) 142 storing tracks of user data, and a number of parity disks (p) 144 storing parity calculated from the data disks 142, where p can be one or more, indicating the number of disks for storing the calculated parity blocks. An unmodified parity optional flag 148 indicates whether parity should be calculated for unmodified non-sequential tracks in the first cache 14 being promoted to the second cache 18. This optional flag 148 allows for only including unmodified non-sequential tracks in a stride to fill the stride with only unmodified non-sequential tracks. The stride of unmodified non-sequential tracks in the first cache 14 may be indicated in an LSA 32, where the tracks of the stride are striped across m plus p storage devices forming the second cache 18. Alternatively, the second cache 18 may comprise fewer than n devices.

FIG. 8 illustrates an embodiment of the storage RAID configuration 36 that is maintained to determine how to form strides of modified tracks in the second cache 18 to stripe across the disks of the storage 10. A RAID level 150 indicates the RAID configuration to use, a number of data disks (m) 152 storing tracks of user data, and a number of parity disks (p) 154 storing parity calculated from the data disks 152, where p can be one or more, indicating the number of disks for storing the calculated parity blocks. The stride of tracks from the second cache 18 may be striped across disks in the storage system 10.

In one embodiment, the second cache 34 and storage 36 RAID configurations may provide different parameters or have the same parameters, such as different RAID levels, data disks, parity disks, etc.

Figure 9:
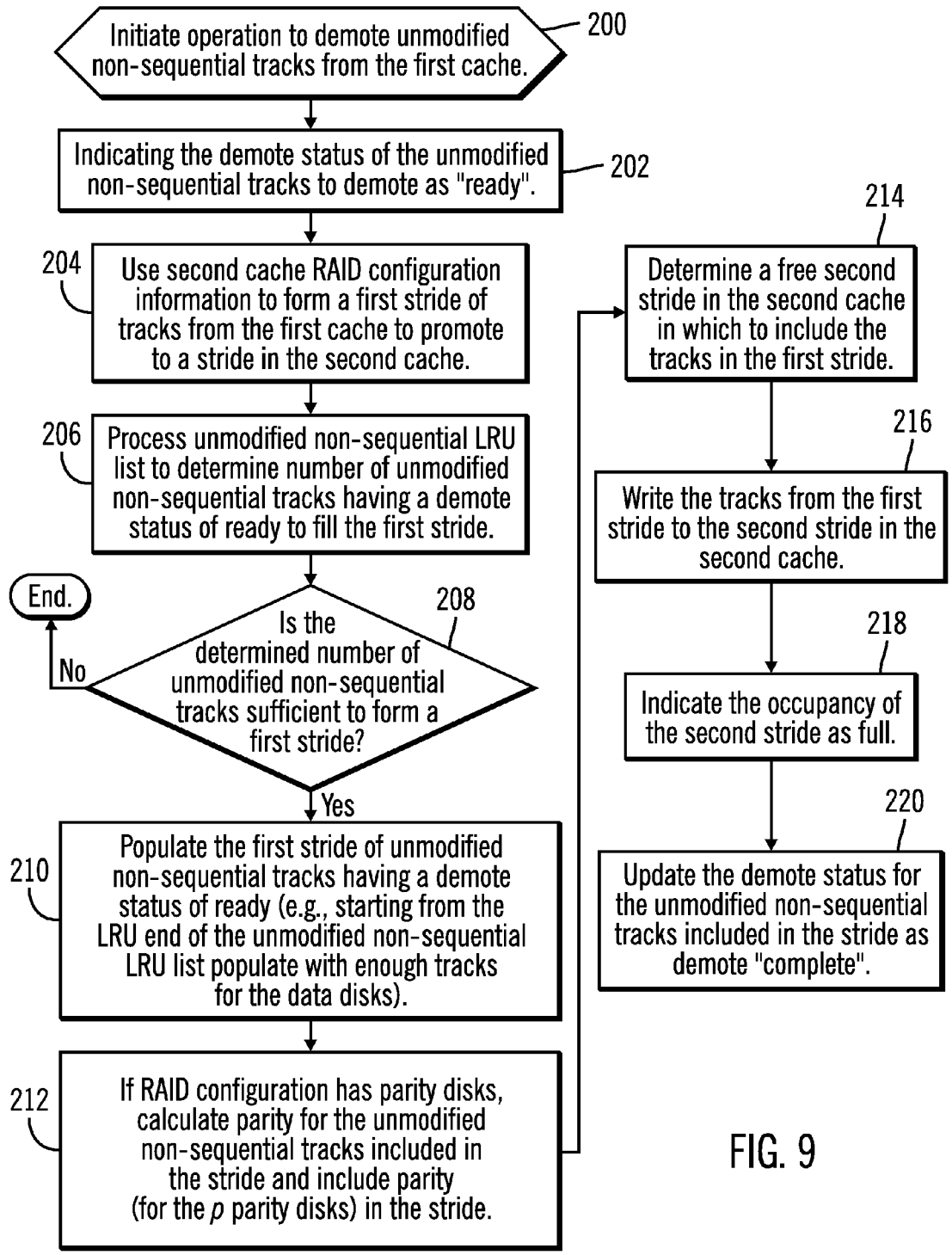
FIG. 9 illustrates an embodiment of operations to demote unmodified non-sequential tracks from the first cache to promote to the second cache.

FIG. 9 illustrates an embodiment of operations performed by the cache manager 24 to demote unmodified non-sequential tracks from the first cache 14 to promote to the second cache 18, where the unmodified non-sequential tracks may be selected from the LRU end of the unmodified non-sequential LRU list 58 when space is needed. Upon initiating (at block 200) the operation to demote selected unmodified non-sequential tracks, the demote status 110 (FIG. 4) of the unmodified non-sequential tracks selected to demote is set (at block 202) to "ready". The cache manager 24 uses (at block 204) the second cache RAID configuration information 34 to form a first stride of tracks from the first cache 114 to promote to a stride in the second cache 18. For instance, forming the first stride of tracks may comprise forming a stride for a RAID configuration based on a RAID configuration defined 34 for the second cache as having n devices including m devices for storing tracks of data and at least one parity device p to store parity data calculated from the tracks of data for the m devices. Further, the first stride of tracks may be striped across n solid state storage devices without parity to form the second stride in embodiments where the second cache comprises at least n solid state storage devices.

The cache manager 24 processes (at block 206) the unmodified non-sequential LRU 58 list to determine a number of unmodified non-sequential tracks having a demote status 110 of ready in their control blocks 100. If the cache manager 24 determines (at block 208) that the number of unmodified non-sequential tracks is sufficient to form a stride, then the cache manager 24 populates (at block 210) the first stride of unmodified non-sequential tracks having a demote status 110 of ready. In one embodiment, the first stride may be populated starting from the LRU end of the unmodified non-sequential LRU list 58 and use enough tracks for the data disks in stride. If (at block 212) the RAID configuration specifies parity disks, then the cache manager 24 calculates (at block 212) parity for the unmodified non-sequential tracks included in the stride and includes parity data (for the p parity disks) in the stride. If (at block 208) there are not sufficient unmodified non-sequential tracks in the first cache 14 to fill the first stride, then control ends until there are a sufficient number of unmodified non-sequential tracks having the demote ready status available to populate the first stride.

After populating the first stride (at blocks 210 and 212), the cache manager 14 determines (at block 214) a free second stride in the second cache 18 in which to include the tracks from the first stride. The tracks from the first stride are written or striped (at block 216) as a full stride write to the second stride across the devices forming the second cache 18. Upon filling the second stride in the second cache 18 with the tracks from the first stride, the cache manager 14 indicates (at block 218) the occupancy 136 of the stride information 130 for the second stride as full. The cache manager 24 updates (at block 220) the demote status 110 for the unmodified non-sequential tracks included in the stride as demote "complete".

Although the operations of FIG. 9 are described as demoting unmodified non-sequential tracks from the first cache 14 to promote to the second cache 18, in alternative embodiments, the operations may apply to demoting different types of tracks, such as modified, sequential, etc.

With the described embodiments, the unmodified tracks from the first cache 14 are gathered and written as a stride to the second cache 18 so that one Input/Output (I/O) operation is used to transfer multiple tracks.

Figure 10:
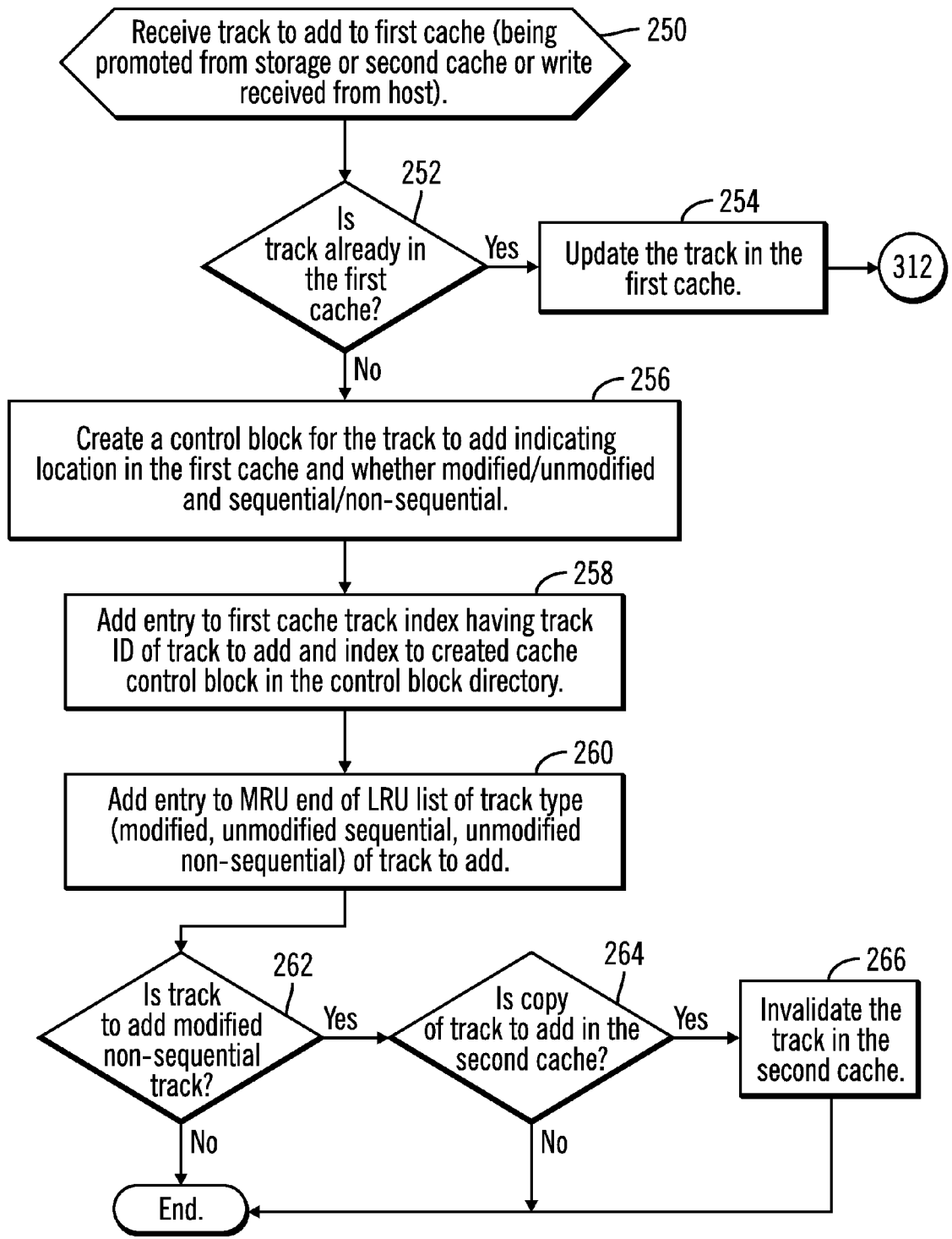
FIG. 10 illustrates an embodiment of operations to add a track to the first cache.

FIG. 10 illustrates an embodiment of operations performed by the cache manager 24 to add, i.e., promote, a track to the first cache 14, which track may comprise a write or modified track from a host 2a, 2b . . . 2n, a non-sequential track in the second cache 18 that is subject to a read request and as a result moved to the first cache 14, or read requested data not found in either cache 14 or 18 and retrieved from the storage 10. Upon receiving (at block 250) the track to add to the first cache 14, if (at block 252) a copy of the track is already included in the first cache 14, i.e., the received track is a write, then the cache manager 24 updates (at block 254) the track in the first cache 14. If (at block 252) the tracks is not already in the cache, then the cache manager 24 creates (at block 256) a control block 100 (FIG. 4) for the track to add indicating the location 104 in the first cache 14 and whether the track is modified/unmodified 106 and sequential/non-sequential 108. This control block 100 is added to the control block directory 52 of the first cache 14. The cache manager 24 adds (at block 258) an entry to the first cache track index 50 having the track ID of track to add and an index to the created cache control block 100 in the control block directory 52. An entry is added (at block 260) to the MRU end of the LRU list 54, 56 or 58 of the track type of the track to add. If (at block 262) the track to add is a modified non-sequential track and if (at block 264) a copy of the track to add is in the second cache 18, as determined from the second cache track index 70, then the copy of the track in the second cache 18 is invalidated (at block 266), such as by setting the valid/invalid flag 128 in the cache control block 120 for the track in the second cache 18 to invalid. If (at block 306) the track to add is unmodified sequential, control ends.

Figure 11:
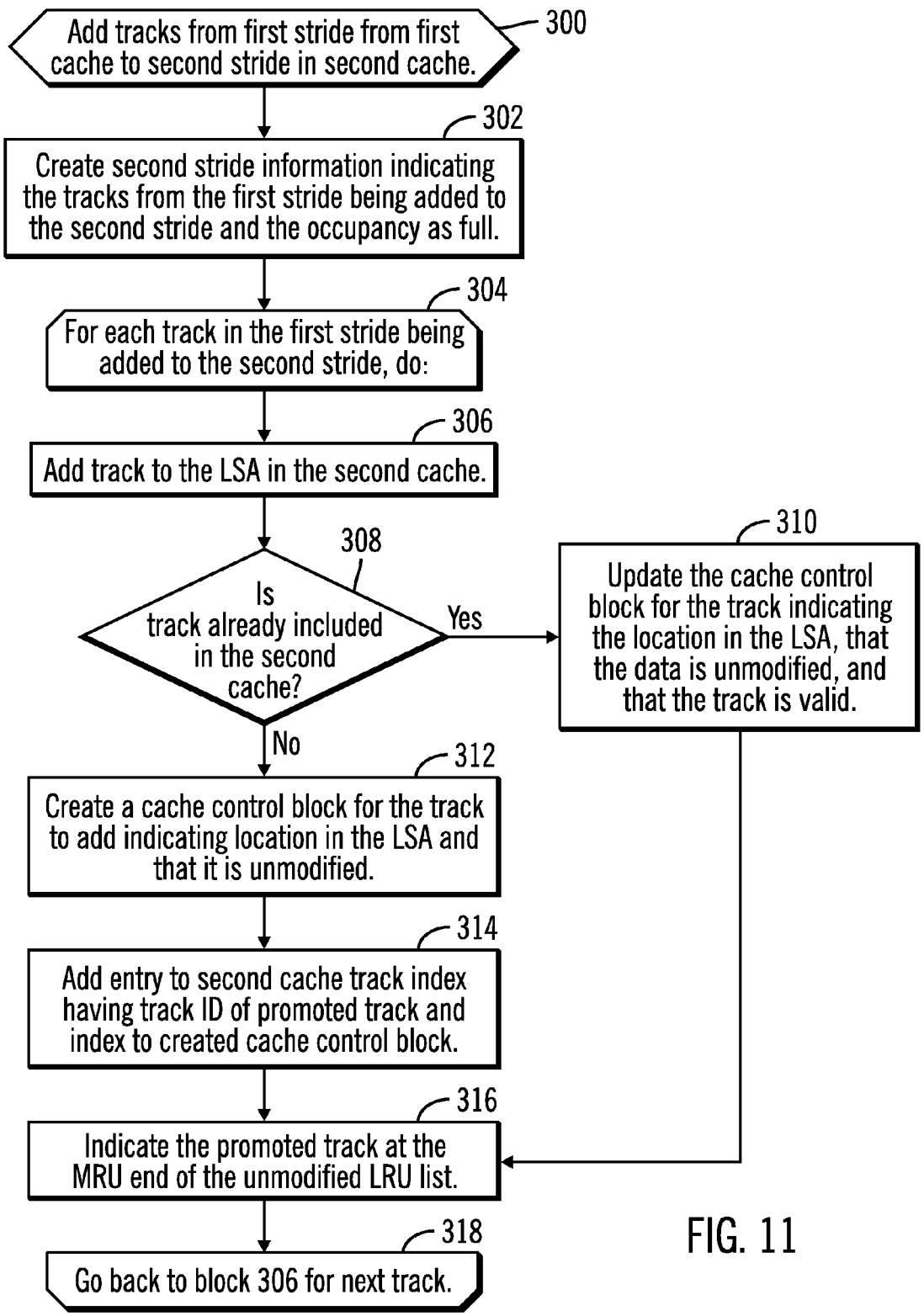
FIG. 11 illustrates an embodiment of operations to add tracks from the first stride to the second stride.

FIG. 11 illustrates an embodiment of operations performed by the cache manager 24 to add tracks from the first stride from the first cache 14 to the second stride in the second cache 18. The cache manager 24 creates (at block 302) stride information 130 (FIG. 6) for the second stride indicating the tracks 134 from the first stride being added and indicating the occupancy 136 as full. For each track in the first stride being added, a loop of operations is performed at blocks 304 through 318. The cache manager 24 adds (at block 302) indication, such as the track ID, of the track being promoted to the LSA 32 in the second cache 18. If (at block 308) the track being added is already in the second cache 18, then the cache manager 24 updates (at block 310) the cache control block 120 for the track indicating the location 124 in the LSA 32, that the data is unmodified 126, and that and that the track is valid 128. If (at block 308) the track is not already in the second cache 18, then the cache manager 24 creates (at block 312) a control block 120 (FIG. 5) for the track to add indicating the track location 124 in the LSA 32 and whether the track is modified/unmodified 126. An entry is added (at block 314) to the second cache track index 70 having the track ID of the promoted track and an index to the created cache control block 120 in the control block directory 72 for the second cache 18. From block 310 or 316, the cache manager 24 indicates (at block 316) the promoted track at the MRU end of the unmodified LRU list 74, such as by adding the track ID to the MRU end.

Figure 12:
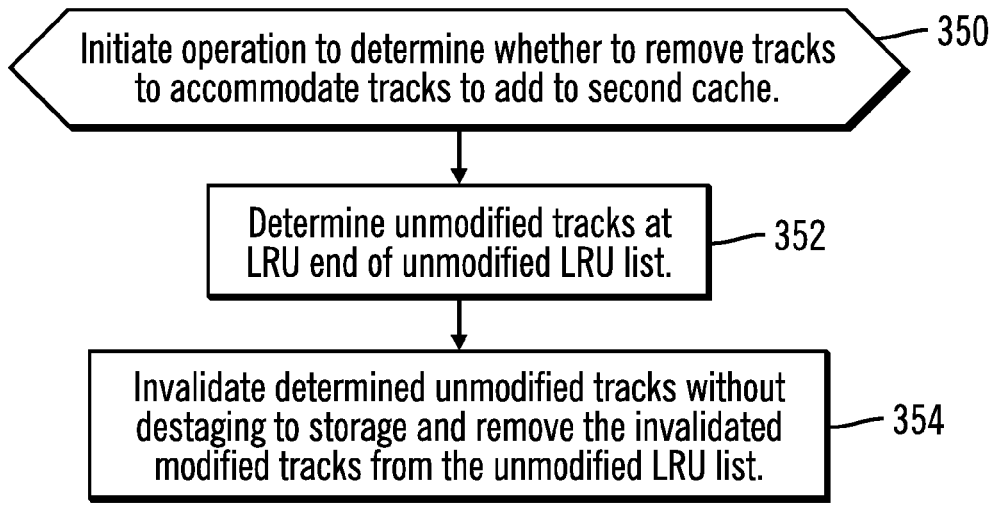
FIG. 12 illustrates an embodiment of operations to free space in the second cache.

FIG. 12 illustrates an embodiment of operations performed by the cache manager 24 to free space in the second cache 18 for new tracks to add to the second cache 18, i.e., tracks being demoted from the first cache 14. Upon initiating this operation (at block 350) the cache manager 24 determines (at block 352) unmodified tracks in the second cache 18 from the LRU end of the unmodified LRU list 74 and invalidates (at block 354) the determined unmodified tracks without destaging the invalidated unmodified tracks to the storage 10, and also removes the invalidated unmodified tracks from the unmodified LRU list 74 and indicates the track as invalid 128 in the cache control block 120 for the track. The unmodified tracks in the second cache 18 may comprise read tracks added to the first cache 14 or modified tracks destaged from the first cache 14. Further, the tracks selected by the cache manager 24 for demotion from the second cache 18 may be from different strides formed in the second cache 18. Further, strides in the second cache may include both valid and invalid tracks, where tracks are invalidated by demoting from the second cache 18 or by the track being updated in the first cache 18.

In certain embodiments, the cache manager 24 uses different track demotion algorithms to determine tracks to demote from the first cache 14 and the second cache 18 by using separate LRU lists 58 and 74 for the first 14 and second 18 caches 18, respectively, to determine the tracks to demote. The algorithms used to select tracks for demotion in the first 14 and second 18 caches may consider characteristics of the tracks in the first 14 and second 18 caches to determine tracks to demote first.

Figure 13:
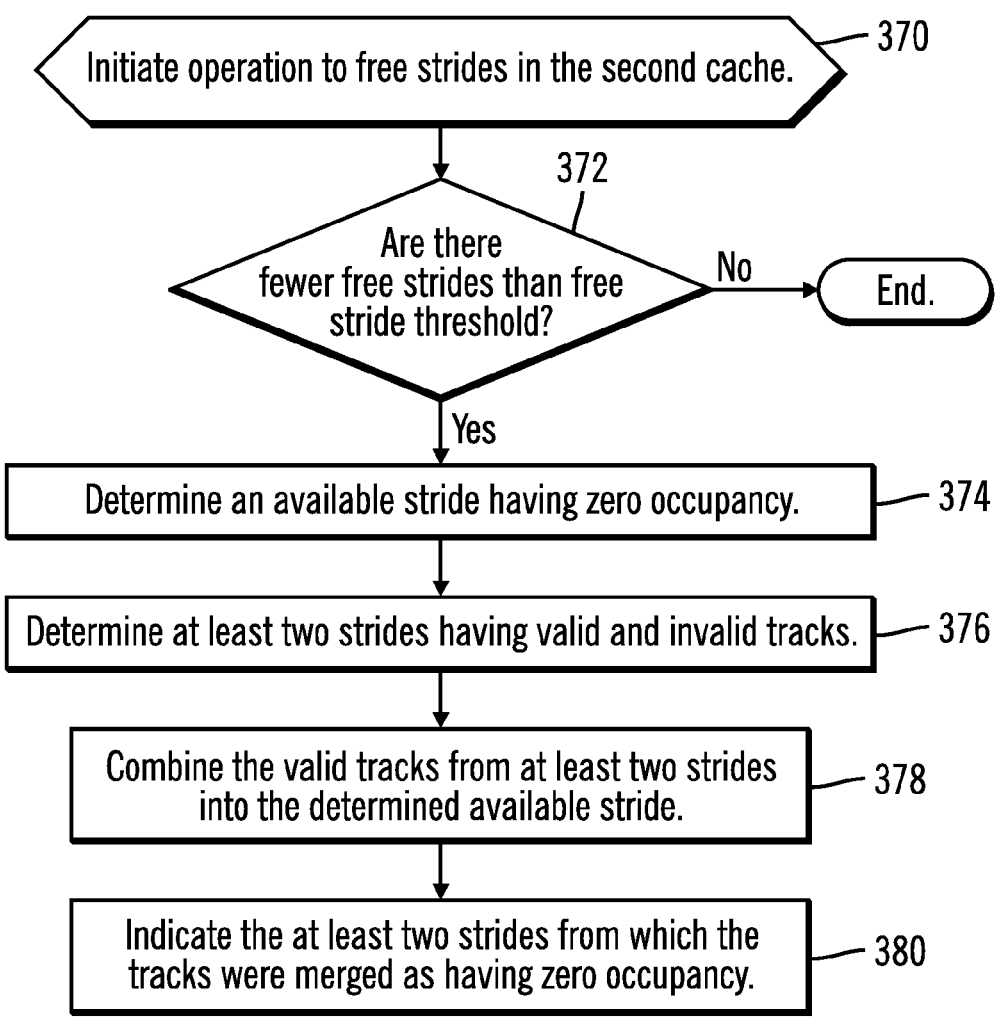
FIG. 13 illustrates an embodiment of operations to free strides in the second cache.

FIG. 13 illustrates an embodiment of operations performed by the cache manager 24 to free strides in the second cache 18 to make available for strides of tracks in the first cache 14. Upon initiating (at block 370) an operation to free strides in the second cache 18, the cache manager determines (at block 372) if the number of free strides, i.e., strides having an occupancy 136 of zero, is less than a free stride threshold. For instance, the cache manager 24 may ensure that there always are at least two or some other number of free strides to be available for strides formed from the first cache 14 tracks. If the number of free strides is not below the threshold, then control ends. Otherwise, if (at block 372) the number of free strides is less than the threshold, then the cache manager 24 determines (at block 374) an available stride having zero occupancy 136 and determines (at block 376) at least two strides that are partially full, i.e., having valid and invalid tracks, whose valid tracks can fit into the free stride. The cache manager 24 combines (at block 378) the valid tracks from the determined at least two partially full strides into the determined available stride. The cache manager 24 then indicates (at block 380) the at least two strides from which the tracks merged as having zero occupancy 136, so they are available to receive tracks from strides from the first cache 14.

Figure 14:
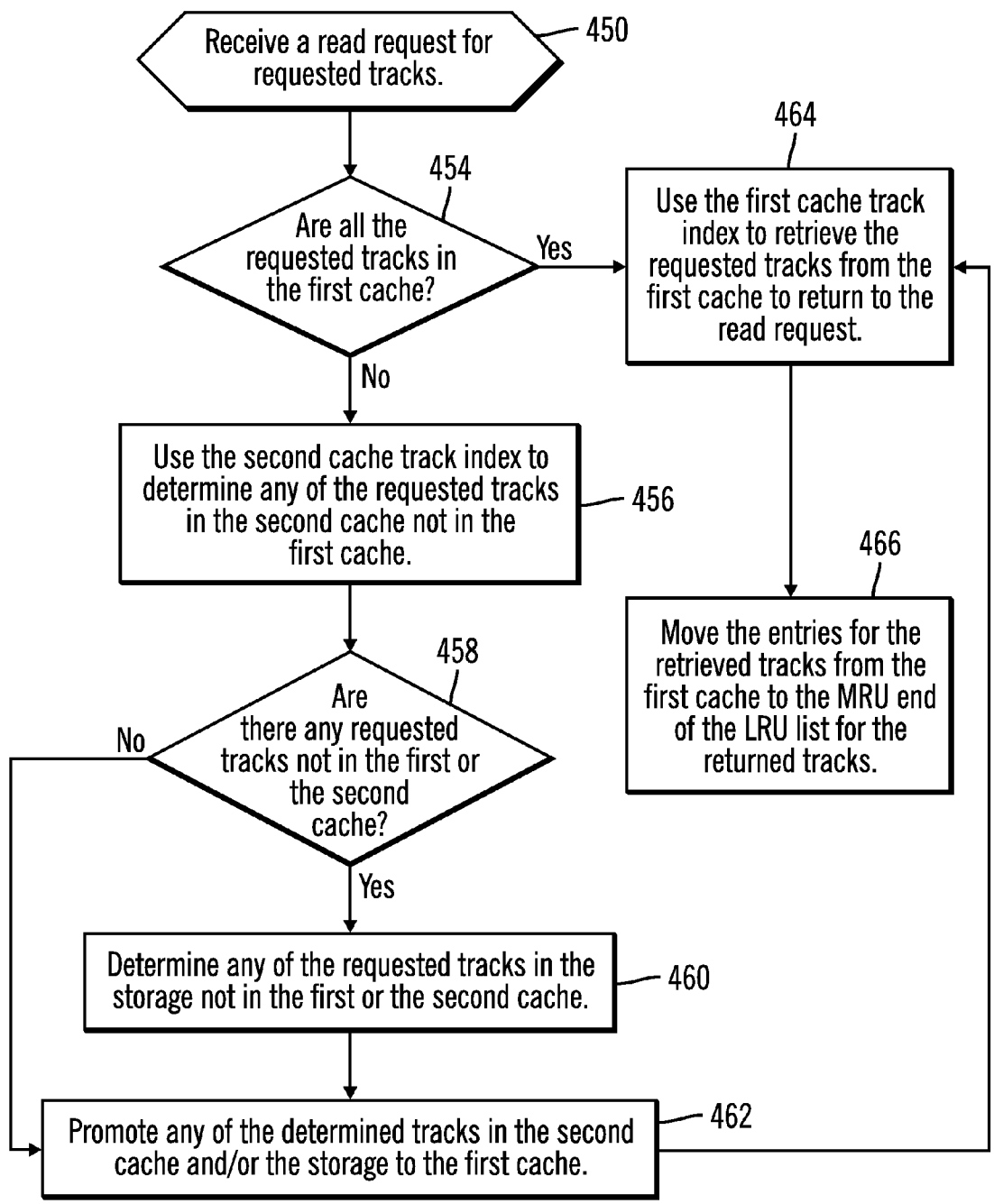
FIG. 14 illustrates an embodiment of operations to process a request for tracks to return to a read request.

FIG. 14 illustrates an embodiment of operations performed by the cache manager 24 to retrieve requested tracks for a read request from the caches 14 and 18 and storage 10. The storage manager 22 processing the read request may submit requests to the cache manager 24 for the requested tracks. Upon receiving (at block 450) the request for the tracks, the cache manager 24 uses (at block 454) the first cache track index 50 to determine whether all of the requested tracks are in the first cache 14. If (at block 454) all requested tracks are not in the first cache 14, then the cache manager 24 uses (at block 456) the second cache track index 70 to determine any of the requested tracks in the second cache 18 not in the first cache 14. If (at block 458) there are any requested tracks not found in the first 14 and second 18 caches, then the cache manager 24 determines (at block 460) any of the requested tracks in the storage 10, from the second cache track index 70, not in the first 14 and the second 18 caches. The cache manager then promotes (at block 462) any of the determined tracks in the second cache 18 and the storage 10 to the first cache 14. The cache manager 24 uses (at block 464) the first cache track index 50 to retrieve the requested tracks from the first cache 14 to return to the read request. The entries for the retrieved tracks are moved (at block 466) to the MRU end of the LRU list 54, 56, 58 including entries for the retrieved tracks.

With the operations of FIG. 13, the cache manager 24 retrieves requested tracks from a highest level cache 14, then second cache 18 first before going to the storage 10, because the caches 14 and 18 would have the most recent modified version of a requested track. The most recent version is first found in the first cache 14, then the second cache 18 if not in the first cache 14 and then the storage 10 if not in either cache 14, 18.

Described embodiments provide techniques to group tracks in a first cache in strides defined according to a RAID configuration for the second cache, so that tracks in the first cache can be grouped in strides to a second cache. The tracks cached in the second cache may then be grouped into strides, defined according to a RAID configuration for the storage, and then written to the storage system.

Described embodiments provide techniques for promoting tracks from a first cache in strides so that the tracks may be written as full stride writes to strides in the second cache to improve the efficiency of cache promotion operations. The described embodiments allow full stride writes to be used to promote demoted tracks in the first cache to the second cache in order to conserve resources by promoting an entire stride to the second cache as a single I/O operation.

Further, while tracks are being promoted from the first cache 14 to the second cache 18 as strides, tracks are demoted from the second cache 18 on a track-by-track basis according to a cache demotion algorithm, such as an LRU algorithm.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for managing data in a cache system, comprising:

in response to a first cache being full, destaging modified non-sequential tracks indicated in a modified list from the first cache to a storage;

indicating the non-sequential modified tracks destaged from the first cache to the storage as unmodified non-sequential tracks in the first cache;

indicating the unmodified non-sequential tracks in the first cache in a first unmodified list, wherein the first unmodified list only indicates unmodified non-sequential tracks in the first cache;

determining tracks that are indicated in the first unmodified list of unmodified tracks in the first cache stored in a storage system to demote from the first cache, wherein each stride in the first cache and a second cache is populated with tracks of data, and wherein the tracks are maintained in the storage system;

forming a first stride including the determined tracks from the first unmodified list to demote based on a configuration of the second cache;

determining a second stride in the second cache in which to include the tracks in the first stride;

adding the tracks from the first stride to the second stride in the second cache;

indicating the tracks added to the second stride in the second cache in a second unmodified list of unmodified tracks in the second cache;

determining tracks from the second unmodified list in strides in the second cache to demote from the second cache; and demoting the determined tracks from the second unmodified list to demote from the second cache.

2. The method of claim 1, wherein the first cache is a faster access device than the second cache and wherein the second cache is a faster access device than the storage system.

3. The method of claim 1, wherein the determined tracks to demote from the second cache are from different strides in the second cache.

4. The method of claim 1, further comprising:
receiving a write to a track in the first cache;
determining whether the track receiving the write is included in the second cache; and
invalidating the track in the second cache updated in the first cache in response to determining that the track written to in the first cache is included in the second cache.

5. The method of claim 1, further comprising:
determining whether to consolidate strides in the second cache;
in response to determining to consolidate strides, performing:
determining one available stride having no tracks;
determining at least two strides having both valid and invalid tracks;
combining the valid tracks from at least two strides into the determined available stride, wherein the at least two strides are available to store tracks from strides demoted from the first cache.

6. The method of claim 1, wherein forming the first stride of tracks comprises forming a stride for a Redundant Array of Independent Disk (RAID) configuration based on a RAID configuration defined for the second cache as having n devices including m devices for storing tracks of data and at least one parity device to store parity data calculated from the tracks of data for the m devices.

7. The method of claim 1, wherein the first unmodified list comprises a first least recently used (LRU) list for tracks in the first cache, wherein the second unmodified list comprises a second LRU list for tracks in the second cache.

8. The method of claim 1, wherein the first cache comprises a Dynamic Random Access Memory (DRAM), the second cache comprises a plurality of flash devices, and the storage system is comprised of a plurality of slower access devices than the flash devices.

9. The method of claim 1, further comprising:
indicating the determined tracks to demote from the second cache as invalid, wherein strides in the second cache include valid and invalid tracks.

10. The method of claim 5, wherein the determination of whether to consolidate strides is performed in response to determining that there is only one available stride having all free tracks after writing the tracks in the stride demoted from the first cache to one available stride in the second cache.

11. The method of claim 6, wherein the first cache comprises a dynamic random access memory (DRAM), and wherein the second cache comprises n solid state storage devices, wherein the first stride of tracks from the first cache are striped across the n solid state storage devices to form the second stride in the second cache.

* * * * *